Figure 1:
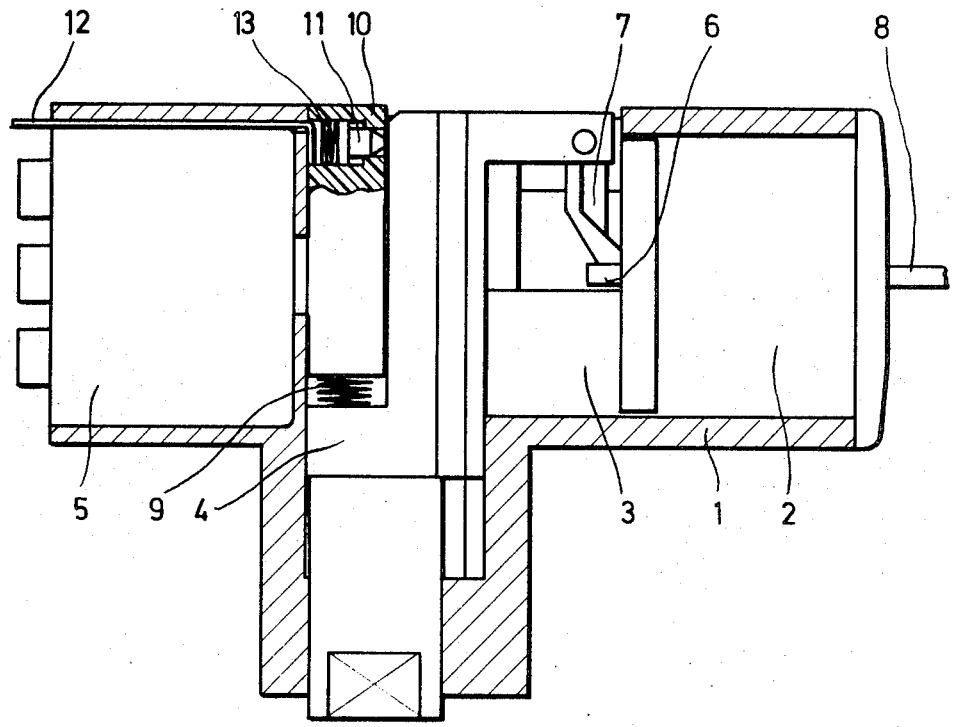

United States Patent
Duren et al.

[15] 3,656,098
[45] Apr. 11, 1972

[54] GUIDE LOCK FOR MOTOR VEHICLES

[72] Inventors: Rainer Duren; Klaus Neidig, both of Wolfsburg, Germany

[73] Assignee: Volkswagenwerk Akt.

[22] Filed: Oct. 17, 1969

[21] Appl. No.: 867,300

[30] Foreign Application Priority Data

Oct. 19, 1968 Germany.....................P 18 04 142.4

[52] U.S. Cl. ..............................340/52 D, 200/44, 70/252
[51] Int. Cl. ........................................................G08b 21/00
[58] Field of Search......................340/52, 52 D; 200/44, 45; 70/237, 252

[56] References Cited

UNITED STATES PATENTS

| | | | |
|---|---|---|---|
| 2,215,162 | 9/1940 | Scott | 340/52 |
| 2,613,258 | 10/1952 | Azano | 340/52 |
| 3,261,187 | 7/1966 | Eichenauer | 70/252 |

*Primary Examiner*—Alvin H. Waring
*Attorney*—Watson, Cole, Grindle & Watson

[57] ABSTRACT

A steering column lock for motor vehicles with a warning device operative whenever the door of the vehicle is opened upon the key having been failed to be pulled out.

2 Claims, 2 Drawing Figures

GUIDE LOCK FOR MOTOR VEHICLES

This invention relates to a guide or steering column lock for motor vehicles with an electrical contact arrangement for an acoustic and/or optical warning installation controlled indirectly by a key. This warning device is to become effective whenever the door of the vehicle is opened with the key not having been pulled out.

Various contact arrangements for such warning devices had already been proposed for guide locks. According to one design, a lamella is located at the end of a locking cylinder which is on the side of the key lever, the lamella cooperating with a resilient contact element in the housing of the locking cylinder. Contact making in the locking cylinder is very expensive because of the necessary installation and, moreover, causes difficulties during assembly in the case of various guide lock designs. According to a further design, an additional interrupting contact is arranged on the guide lock which is operated by means of strain bolts. This additional interrupting contact requires relatively considerable additional expenditure. Besides, the space required for this circuit interrupting contact is no longer available in the case of the small type of construction of the guide locks customary nowadays, as for example in the case of the cartridge-shaped guide locks.

According to the invention, a construction is proposed which will save expenditures and space. The invention relates to a guide lock in the case of which the strain bolt is secured in the open position for such a length of time until the key has been pulled out entirely or partly. The special characteristic of this invention is that a constructional element, such as for example the cover, the bolt guide, or a locking piece, is made of a nonconducting material. A spring-loaded contact peg insulated thus with regard to the guide lock, will be arranged in this constructional element. This contact pin lies or connects with the circuit of the acoustic and/or optic warning installation as for example a buzzer, and of a door contact which closes upon the opening of the door. In the opening position of the guide lock, that is to say prior to removal of the key, this contact pin cooperates with the strain bolt. As a result of the fact that the guide lock is always connected to the mass, the previously mentioned circuit has been closed of necessity prior to removal of the key.

Figure 2:
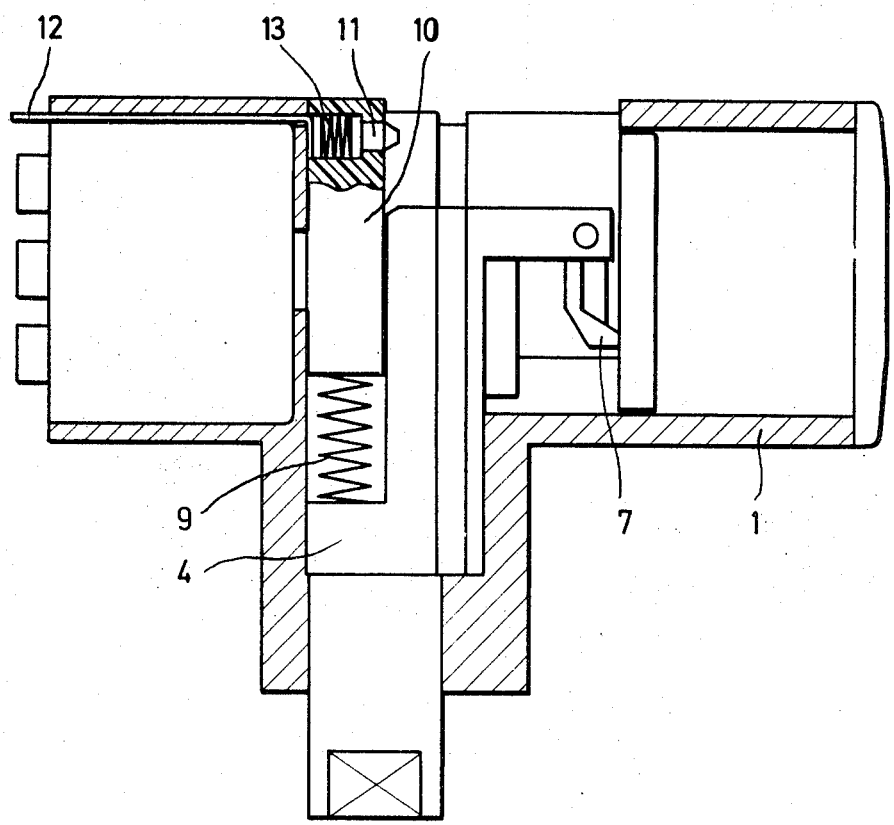

Further objects of the invention will be apparent from the following description when considered in connection with the accompanying drawings in which;

FIG. 1 is a cross-section of the guide lock in the position prior to the removal of the key, and FIG. 2 is a similar view showing the guide lock in the position after removal of the key.

The locking cylinder 2 is arranged in the housing 1 of the guide lock, the cylinder operating the strain bolt 4 and the direct switching 5 for the ignition in a known manner by means of a control cam 3. Before the key is removed point or pin 6 of the key will secure the strain bolt 4 by means of the safety catch 7 arranged swingingly on the strain bolt 4 for such a length of time until the key 8 has been partially removed. After the key 8 has been removed, the strain bolt 4 is moved tensionally by the strain bolt spring 9 into the locking position. In this design, given by way of example, the locking piece or member 10 needed for this guide lock construction is made of nonconducting material. The contact pin 11 is in contact with the strain bolt 4 in its position "prior to removal of the key," while in the position "after removal of the key," this contact is interrupted. Carrying of the current takes place effectively by means of a strand of ribbon 12 which has been stripped correspondingly at the point of contact with the spring 13 of the contact pin.

We claim:

1. Steering column lock for motor vehicles of the type wherein a locking of the steering column takes place only after withdrawal of the key from the locking cylinder (2) thereof by movement of a lock bolt (4) made of electrically conductive material into a locking position and with a closed electrical contact arrangement for acoustical or optical warning installations when the lock bolt is not moved into its locking position, characterized in that the electrical contact arrangement comprises said lock bolt (4) and a contact pin (11) projecting into the path of movement of said bolt (4), said contact pin being housed for movement by said lock bolt into and out of an insulated element (10), said element being disposed in opposite relation to said lock bolt as compared to said locking cylinder, whereby said lock bolt (4) and said contact pin (11) will contact each other during movement of said bolt thereby making an electric contact whenever said lock bolt (4) is not moved into its final locking position.

2. A lock for motor vehicles according to claim 1, in which a spring is provided in said element (10) for said contact pin with one end of said spring being in contact with said pin and the other end thereof with a lead-in cable.

* * * * *